(12) United States Patent
Trezise et al.

(10) Patent No.: US 11,280,976 B2
(45) Date of Patent: Mar. 22, 2022

(54) FIBER SPLICE CLOSURE HAVING A RAISED DECK COVERING A SPLITTER

(71) Applicant: PPC Broadband Fiber Ltd., Woodbridge (GB)

(72) Inventors: Shaun Trezise, Aldeburgh (GB); Kim Leeson, Ipswich (GB)

(73) Assignee: PPC BROADBAND FIBER LTD., Woodbridge (GB)

( * ) Notice: Subject to any disclaimer, the term of this patent is extended or adjusted under 35 U.S.C. 154(b) by 0 days.

(21) Appl. No.: 16/411,126

(22) Filed: May 13, 2019

(65) Prior Publication Data

US 2019/0346646 A1 Nov. 14, 2019

Related U.S. Application Data

(60) Provisional application No. 62/670,622, filed on May 11, 2018.

(51) Int. Cl.
*G02B 6/44* (2006.01)
*G02B 6/38* (2006.01)

(52) U.S. Cl.
CPC ......... *G02B 6/4455* (2013.01); *G02B 6/3897* (2013.01); *G02B 6/4446* (2013.01); *G02B 6/4471* (2013.01)

(58) Field of Classification Search
CPC .. G02B 6/4455; G02B 6/4471; G02B 6/4446; G02B 6/3897; G02B 6/4444; G02B 6/4452; G02B 6/445; G02B 6/4454
See application file for complete search history.

(56) References Cited

U.S. PATENT DOCUMENTS 5,217,808 A * 6/1993 Cobb ..................... G02B 6/443
428/392
5,315,684 A * 5/1994 Szegda ................ G02B 6/3887
385/139

(Continued)

FOREIGN PATENT DOCUMENTS

CN 203930167 U 11/2014

OTHER PUBLICATIONS

Oct. 1, 2019 International Search Report issued in PCT/IB2019/000576.

*Primary Examiner* — Andrew Jordan
(74) *Attorney, Agent, or Firm* — MH2 Technology Law Group LLP (57) ABSTRACT

A fiber splice closure for housing an optical connection between a distribution cable and at least one drop cable of an optical network includes a base and an insert. The base includes round drop cable ports configured to receive a drop cable containing a first optical fiber. Screw holes are arranged in a radial side wall of the drop cable ports and receive a fixing device to secure the drop cable. A round port receives a distribution cable containing a second optical fiber. A clamp secures the distribution cable to the base. An insert has first and second wrap guides that house excess first optical fiber. A center section is arranged between the first and second wrap guides and includes a splitter module, splice protector holder elements that hold splice protectors, an LC adaptor that receives the second optical fiber from the distribution cable, and an LC connector module that connects the first optical fiber to the splitter, which in turn is connected to the LC adaptor, thereby providing an optical connection between the distribution cable and the drop cable.

22 Claims, 7 Drawing Sheets

(56) References Cited

U.S. PATENT DOCUMENTS

| | | | | |
|---|---|---|---|---|
| 5,335,408 | A * | 8/1994 | Cobb | G02B 6/443 29/447 |
| 5,371,819 | A * | 12/1994 | Szegda | G02B 6/3887 385/101 |
| 5,371,821 | A * | 12/1994 | Szegda | G02B 6/3887 385/139 |
| 5,371,827 | A * | 12/1994 | Szegda | G02B 6/3887 385/136 |
| 5,444,810 | A * | 8/1995 | Szegda | G02B 6/3887 385/136 |
| 5,692,090 | A * | 11/1997 | Szegda | G02B 6/3887 385/139 |
| 5,704,400 | A * | 1/1998 | Eldridge | F16L 5/12 138/96 T |
| 5,790,741 | A | 8/1998 | Vincent et al. | |
| 6,340,250 | B1 * | 1/2002 | Auclair | G02B 6/4477 385/87 |
| 6,359,223 | B1 * | 3/2002 | Daoud | G02B 6/4428 174/658 |
| 7,568,943 | B2 * | 8/2009 | Harrison | G02B 6/4471 439/441 |
| 10,082,635 | B2 * | 9/2018 | Feng | G02B 6/4452 |
| 10,365,449 | B2 * | 7/2019 | Thompson | G02B 6/4454 |
| 2002/0181925 | A1 | 12/2002 | Hodge et al. | |
| 2003/0103750 | A1 | 6/2003 | Laporte et al. | |
| 2004/0001686 | A1 | 1/2004 | Smith et al. | |
| 2004/0156198 | A1 * | 8/2004 | Chen | H01R 33/09 362/655 |
| 2005/0175307 | A1 | 8/2005 | Battey et al. | |
| 2007/0025677 | A1 * | 2/2007 | Harrison | G02B 6/4471 385/138 |
| 2007/0036488 | A1 * | 2/2007 | Harrison | G02B 6/4471 385/76 |
| 2009/0238531 | A1 | 9/2009 | Holmberg et al. | |
| 2010/0074578 | A1 | 3/2010 | Imaizumi et al. | |
| 2010/0086260 | A1 * | 4/2010 | Parikh | G02B 6/4442 385/76 |
| 2012/0308189 | A1 * | 12/2012 | Kimbrell | G02B 6/4471 385/135 |
| 2014/0147082 | A1 * | 5/2014 | Lee | G02B 6/3825 385/78 |
| 2015/0241655 | A1 * | 8/2015 | Burkett | G02B 6/4471 385/134 |
| 2016/0367231 | A1 * | 12/2016 | Uemichi | A61B 8/12 |
| 2018/0074275 | A1 * | 3/2018 | Thompson | G02B 6/4452 |
| 2018/0095232 | A1 * | 4/2018 | Feng | G02B 6/3897 |

* cited by examiner

FIBER SPLICE CLOSURE HAVING A RAISED DECK COVERING A SPLITTER

CROSS-REFERENCE TO RELATED APPLICATION

This nonprovisional application claims the benefit of U.S. Provisional Application No. 62/670,622, filed on May 11, 2018. The disclosure of the prior application is hereby incorporated by reference herein in its entirety.

BACKGROUND

The present disclosure relates to the field of apparatuses for the installation of optical access networks. In particular, the present disclosure relates to a fiber splice closure for a fiber optic network and, more particularly, to an inline fiber splice closure in which an optical fiber from a bundle of optical fibers in a distribution cable is connected with at least one drop cable of an optical access network.

As demand for data and connectivity increases, network planners and installers are seeking more efficient and cost-effective deployment options for their fiber to the X (FTTX) rollouts. FTTX comprises the many variants of fiber optic access infrastructure. These include fiber to the home (FTTH), fiber to the premise (FTTP), fiber to the building (FTTB), fiber to the node (FTTN), and fiber to the curb or cabinet (FTTC). The optical FTTP or FTTH network is an optical access network that supplies broadband or ultra-broadband communication services to a number of end users (e.g., services that require data transmission speeds measuring several hundred Mbit/s or even higher). Some network systems, referred to as hybrid fiber-coaxial (HFC) networks, combine optical fiber and coaxial cable.

Conventional fiber aerial closures are designed to enable service providers to cost-effectively deploy aerial fiber networks in the access network (FTTN, HFC, FTTP, etc.). Some conventional fiber splice closures provide environmental protection for the splicing, management and storage of fiber for aerial, direct-buried and below-grade applications. These closure systems allow for installation, maintenance, and management from central office to the customer's premises for Outside Plant (OSP), passive networks.

A distribution cable can be connected optically to one or more drop cables. As used herein, a "drop cable" is an optical fiber cable that typically runs towards an apartment or office of an end user within a special duct fixed to the surface of the wall or housed within the thickness thereof. To connect the distribution cable to a drop cable, an optical fiber is pulled out of the distribution cable/duct and spliced to an end of an optical fiber of the drop cable.

Conventional fiber splice closures are designed for flat drop cables and figure-of-eight distribution cables. Therefore, it may be desirable to provide a fiber splice closure that is configured to accommodate round drop cables and/or to accommodate various distribution cables having different configurations. It may be desirable to provide a fiber splice closure that is configured to accommodate PPC's Miniflex™ drop cables, including but not limited to PPC's preconnectorized QuikDrop™ cable.

SUMMARY

According to various aspects of the present disclosure, an optical fiber connection closure for housing an optical fiber connection between a distribution cable and at least one drop cable of an optical access network includes a base with an interior. The base includes a round port configured to receive a distribution cable into the interior. The round port is configured to form a seal around the distribution cable, and may be comprised of a flexible material. The base also includes a versatile clamp configured for securing the distribution cable to the base. The size of the versatile clamp can be designed to provide a size of the opening to accommodate various desired size distribution cables. The base also includes drop cable ports configured to receive at least one drop cable containing a first optical fiber. The drop cable ports may have a round shape. Screw holes are arranged in a radial side wall of the drop cable ports that allow for mechanical retention of the drop cable by insertion of a fixing device that grips an outer jacket of the drop cable. The base may include grooved portions for securing fibers from the drop cables.

The optical fiber connection closure may further include an insert that includes first and second wrap guides configured to house an excess length of the first optical fiber of the drop cable. The insert further includes a center section for housing a splitter module, such that the first section and the second section are disposed on opposite sides of the center section. A plurality of splice protector holder elements extend from the top of the center section and are configured to house at least one splice protector. The center section includes an LC bulkhead for securing an LC adaptor to the center section, and fiber clips for storing excess second optical fiber from the distribution cable on a top surface of the center section. The LC adaptor receives the second optical fiber from the distribution cable. An LC connector module is mounted to at least one side face of the center section. The LC connector module connects the first optical fiber with the splitter module, which in turn is connected to the LC adaptor, thereby providing an optical connection between the distribution cable and the drop cable.

The foregoing illustrative summary, as well as other exemplary objectives and/or advantages of the invention, and the manner in which the same are accomplished, are further explained within the following detailed description and its accompanying drawings

BRIEF DESCRIPTION OF THE DRAWINGS

For a further understanding of the disclosure, reference will be made to the following detailed description of the invention which is to be read in connection with the accompanying drawing and in which like numbers refer to like parts, wherein.

DETAILED DESCRIPTION OF EMBODIMENTS

As a preface to the detailed description, it should be noted that, as used in this specification and the appended claims, the singular forms "a," "an," and "the" include plural referents, unless the context clearly dictates otherwise.

Figure 1:
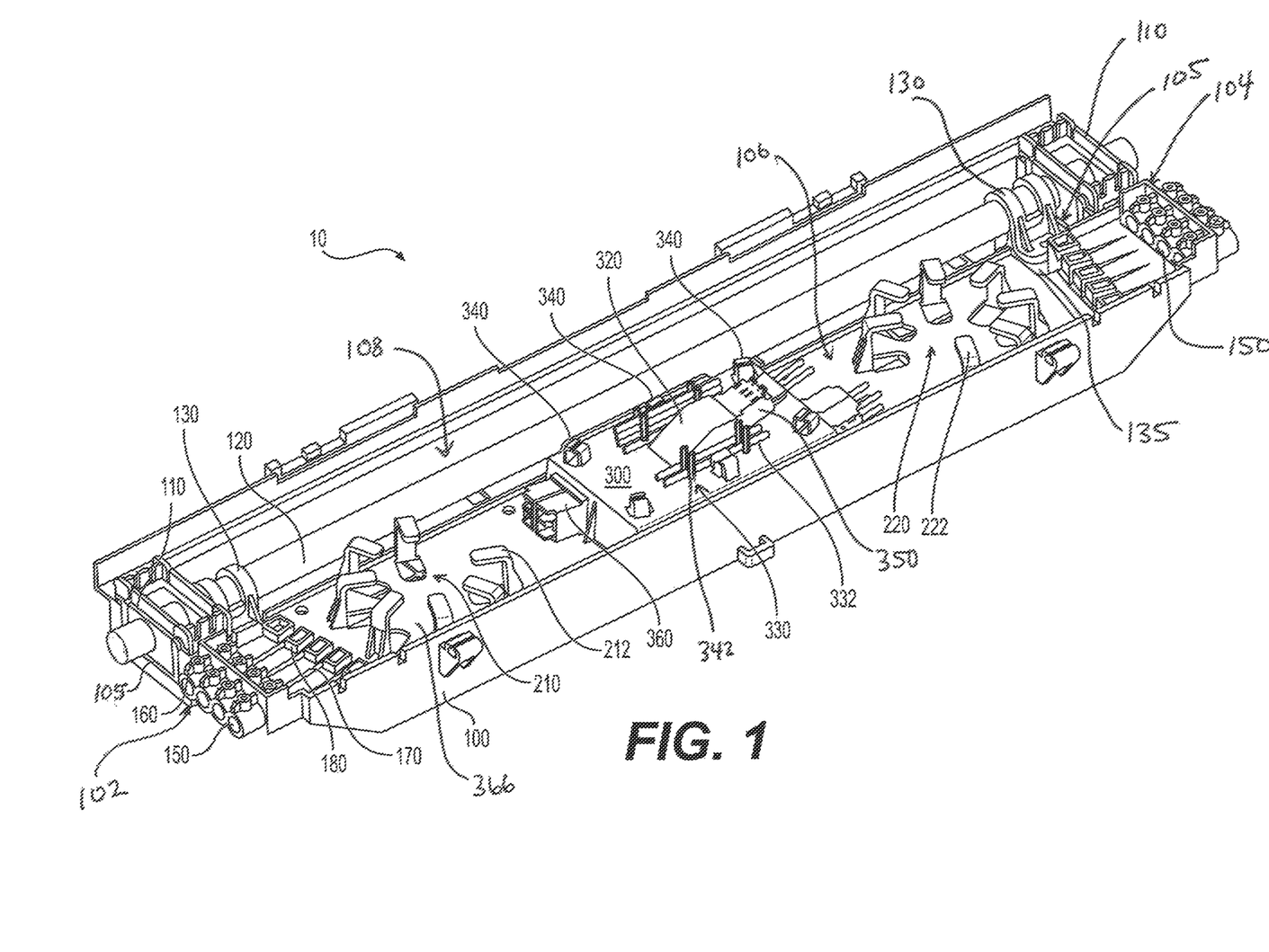
FIG. 1 is a perspective view of an exemplary fiber splice closure according to various aspects of the present disclosure.
Figure 2:
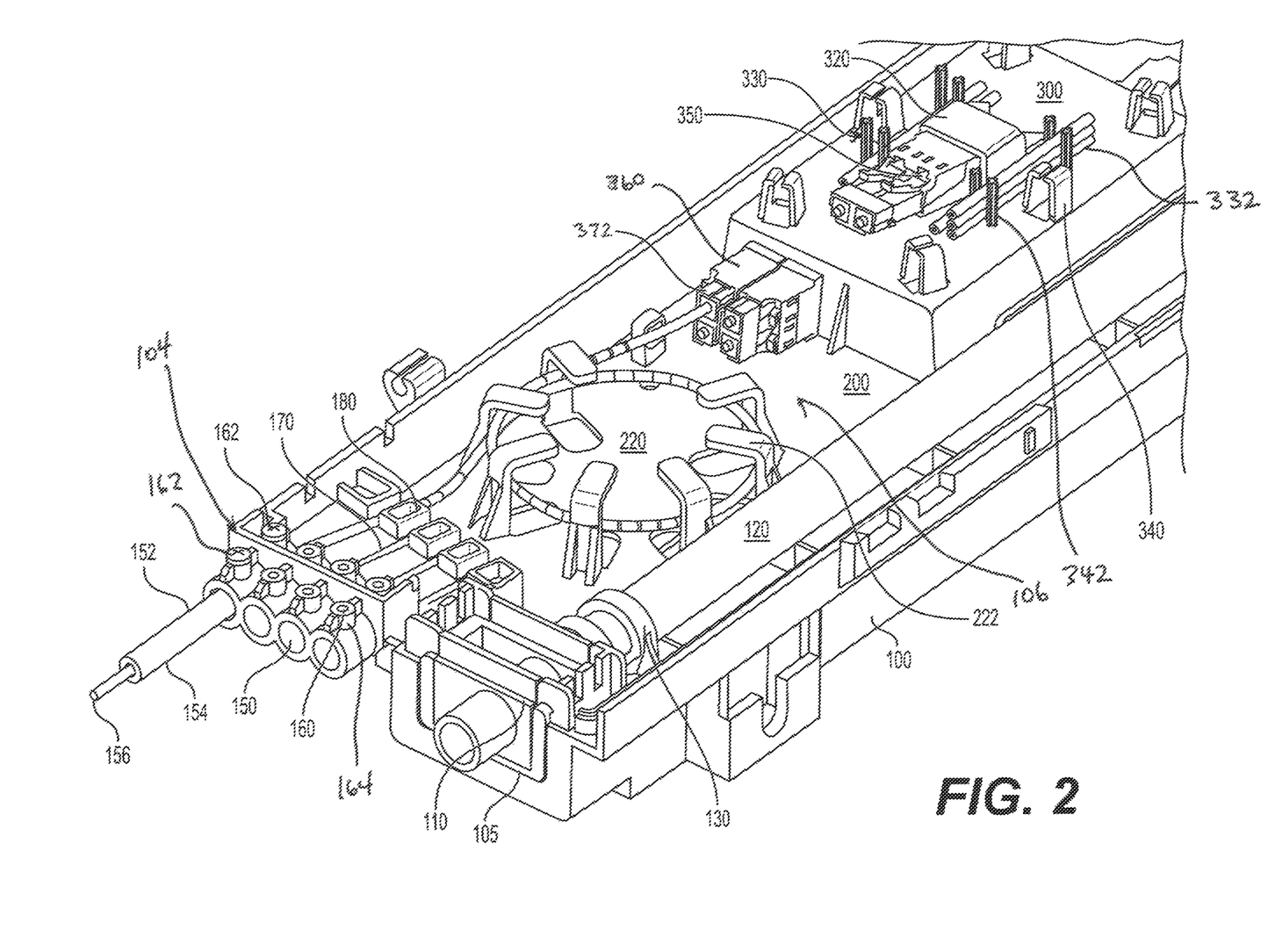
FIG. 2 is a close up perspective view of the fiber splice closure of FIG. 1 further including an optical fiber.

FIGS. 1 and 2 show views of a fiber splice closure 10 (referred to herein as "closure") for connecting optical fibers according to various aspects of the present disclosure. According to an embodiment, the closure 10 includes an elongated base 100 having a first end wall 102 and an opposite second end wall 104 in a longitudinal dimension of the base 100. Each of the first and second end walls 102, 104 of the base 100 includes a recess 105 configured to receive a grommet 110. The base 110 defines an interior 106 including an interior cavity 108 extending between the recesses 105 of the first and second end walls 102, 104. The interior cavity 108 is sized to receive a distribution cable 120 that extends from the first end wall 102 to the second end wall 104.

Figure 6:
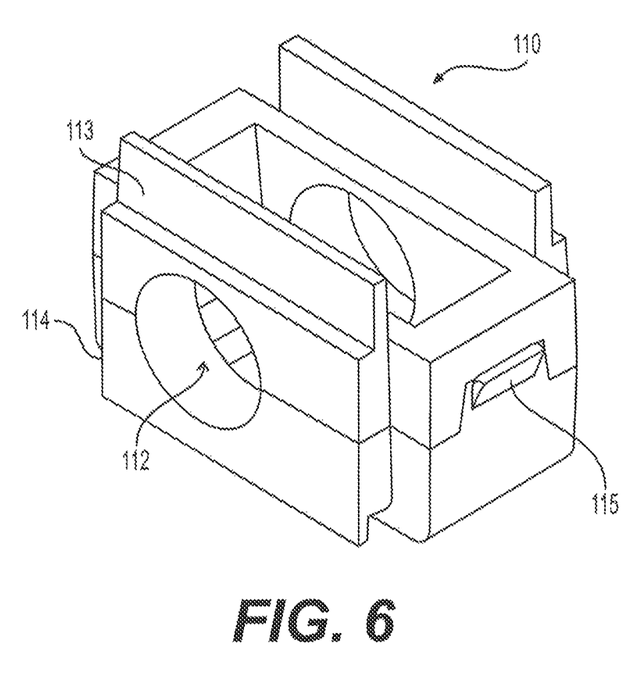
FIG. 6 is a perspective view of an exemplary grommet for use with the fiber splice closure of FIG. 1.

As shown in FIG. 6, the grommet 110 includes an opening 112 configured to receive the distribution cable 120. The grommet 110 may be formed of a flexible material, such as rubber, to form a weather tight seal around the distribution cable 120. The grommet 110 also includes an upper portion 113 and a lower portion 114 that are separable from one another to receive a portion of a preexisting distribution cable 120 (i.e., a cable that cannot be fed through the openings 112 in the grommets 110) in the longitudinal direction. The grommet 110 includes a projection 115 configured to cooperate with a complementary notch (not shown) in the base 100 to hold the grommet 110 at a desired position. The grommet 110 is configured to hold the distribution cable 120 in the opening 112 formed by the upper portion 113 and the lower portion 114 and seal the recess 105 and the opening 112 to prevent the passage of moisture into the closure 10.

Figure 5:
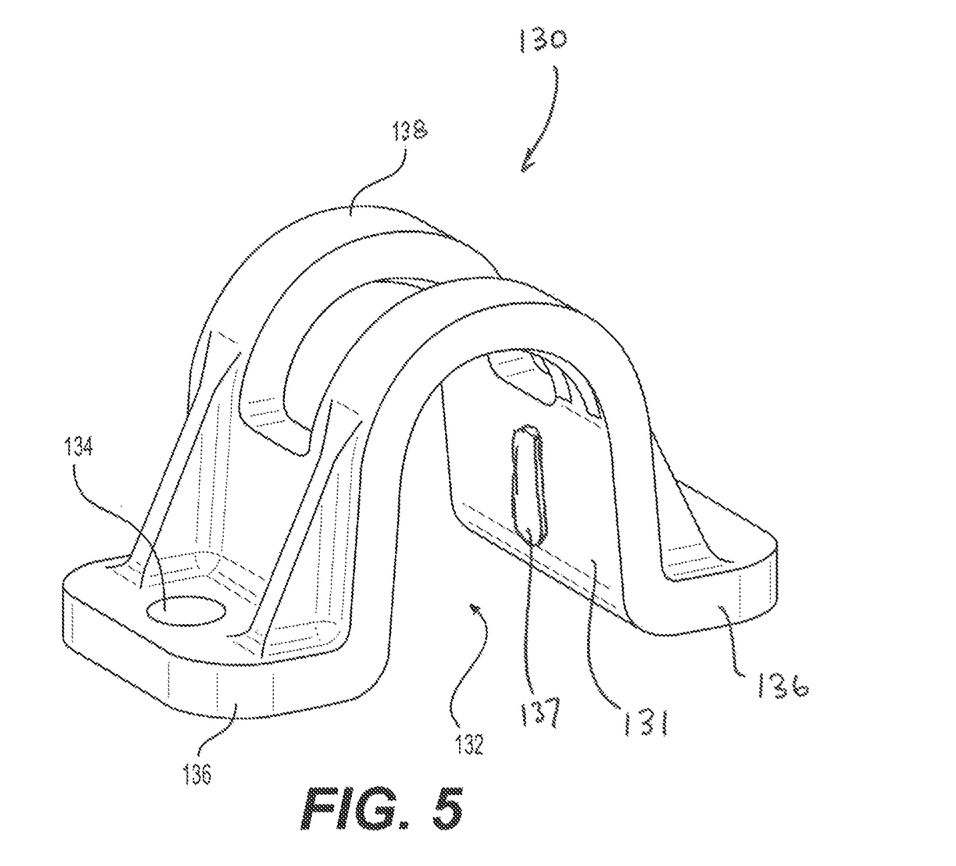
FIG. 5 is a perspective view of an exemplary cable clamp for use with the fiber splice closure of FIG. 1.

The distribution cable 120 may be securely coupled with the base 100 by one or more cable clamps 130. As shown in FIG. 5, each of the cable clamps 130 includes a U-shaped middle portion 138 and flanges 136 extending from ends of the middle portion 138 in opposite directions away from one another. The cable clamp 130 is configured to be secured to the base 100 by inserting a fixing member (not shown), such as a screw, into through holes 134 in the flanges 136 and into a boss 135 on the base 100. The flanges 136 may be configured to directly contact a surface of the base 100 such that, when the clamp 130 is fixed to the base 100, the U-shaped middle portion 138 provides an opening 132 through which the distribution cable 120 may pass. The size of the opening 132 can be designed to receive various sized distribution cables or to receive a desired size distribution cable 120. The cable clamp 130 includes flanges 136 on either side of the opening 132 which directly contact the base 100.

In some aspects, an inner surface 131 of the middle portion 138 may include one or more gripping members 137 that project into the opening 132 to assist with securing the cable 120 to the base 100. For example, the one or more gripping members 137 may include a ridge that extends from the inner surface 131 into the opening 132. The ridge may extend along a portion of the inner surface of the U-shaped middle portion 138 or about the entire inner periphery of the U-shaped middle portion 138 from the end adjacent one flange 136 to the end adjacent the other flange 136. In some aspects, the gripping members 137 may be configured as spherical-shaped protrusions. In some aspects, the inner surface 131 of the middle portion 138 may include gripping members 137 that are spaced apart in an axial direction in which the distribution cable 120 passes through the opening 132. In some aspects, the one or more gripping members 137 may be configured to be received in one or more grooves of a grooved duct or a grooved cable.

Figure 4:
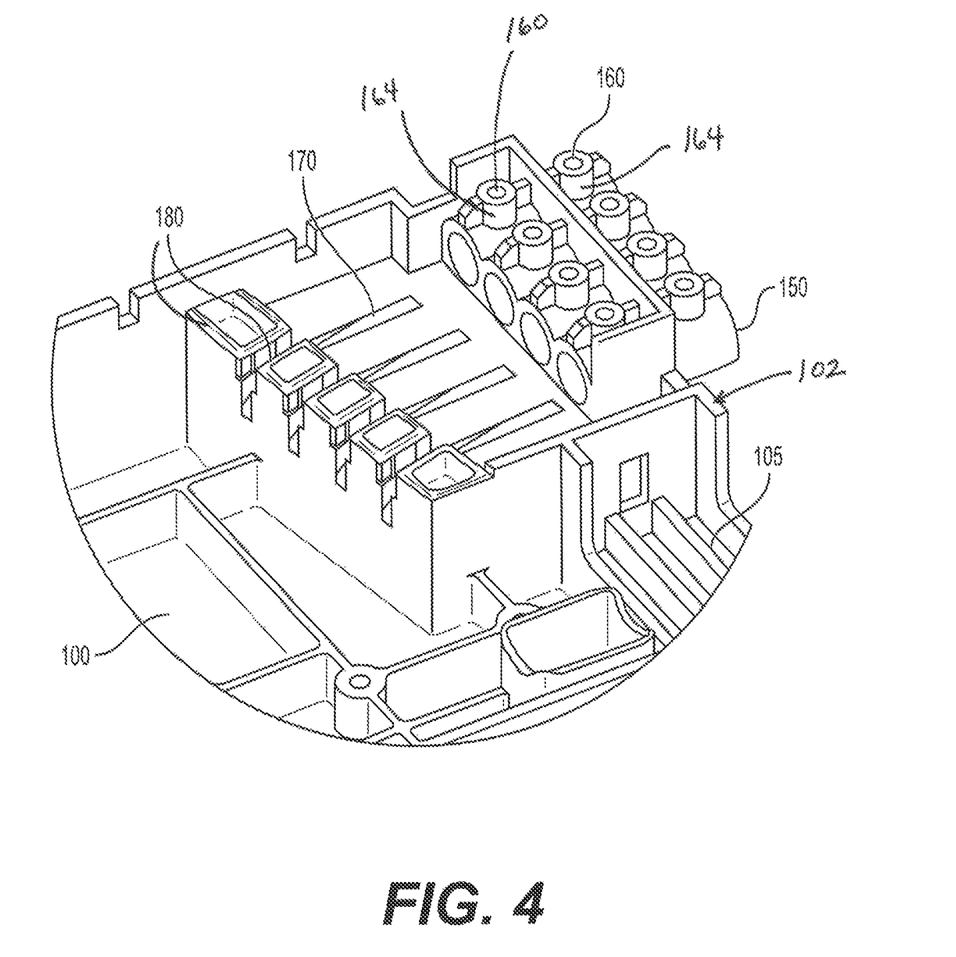
FIG. 4 is a close up perspective view of a portion of the base of fiber splice closure of FIG. 1.

Referring again to FIGS. 1 and 2, as well as FIG. 4, each of the first and second end walls 102, 104 of the base 100 includes a series of drop cable ports 150 adjacent to the recesses 105. The ports 150 may be tubular ports that extend from outside the closure 10 through the respective first or second end wall 102, 104 and into the interior 106 of the closure 10. In some embodiments, as illustrate, the closure 10 includes four drop cable ports 150 at each of the first and second end walls 102, 104. As best shown in FIG. 2, each of the drop cable ports 150 allows for a drop cable 152 to pass into the interior of the closure 10. The drop cable 152 may be secured to the base 100 by fixing members 162, such as screws, which are threaded into holes 160 that are provided in bosses 164 located at a radial side portion of the drop cable ports 150 on either or both sides of each of the first and second end walls 102, 104.

As shown in FIG. 1, the drop cable 152 includes an inner fiber optic cable 156, and an outer jacket 154 to secure and protect the fiber optic cable 156. It should be appreciated that, in some embodiments, the drop cable ports 150 may be configured to accommodate, for example, a drop cable having a 6.0 mm or a 7.0 mm outer jacket diameter, such as a QuikDrop™ drop cable, which has a 2.0 mm and a 3.0 mm Miniflex™ inner fiber cable, respectively. The Miniflex™ cable is preterminated with a QuikPush™ connector that is sized such that the preterminated cable and connector can be pushed through the drop cable ports 150. The preterminated cable is configured to be coupled with an outer housing to provide a LC connector 372 that can be connected with an LC adapter 360 (described in more detail below). The bosses 164 and fixing members 162 are sized such that the fixing member 162 can safety pierce the outer jacket 154 without reaching the fiber optic cable 156.

As best illustrated in FIGS. 2 and 4, in the interior of the closure 10, the outer jacket 154 is removed from the drop cable 152, and the fiber optic cable 156 of the drop cable 152 is accommodated in a groove 170 that extends between fiber holders 180, which help to organize the fiber optic cables in the interior of the closure 10. Each of the grooves 170 is aligned with one of the ports 150. In some aspects, one or more ridges (not shown) may project into each of the grooves 170 in a direction perpendicular to the axial direction of the drop cable 152 in order to grip the fiber optic cable 156. In some aspects, the ridges may be sized and arranged to engage the annular grooves of a Miniflex™ cable to prevent the drop cable 152 from being pushed and/or pulled in the axial direction after being installed in the groove 170.

The closure 10 includes a panel 200 attached to the base 100. In some aspects, the panel 200 may be removably coupled with the base 100 by any conventional coupling mechanism.

Figure 3:
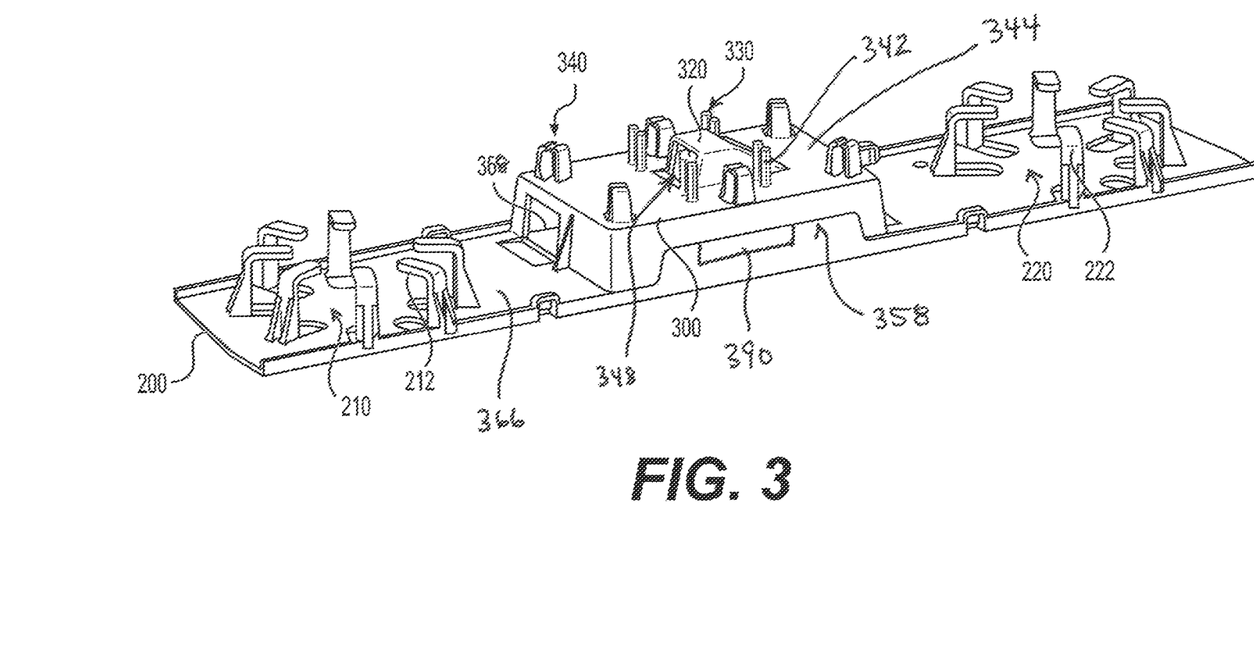
FIG. 3 is a perspective view of an exemplary insert of the fiber splice closure of FIG. 1.

As best shown in FIG. 3, the panel 200 includes a raised deck 300 at a middle portion of the panel 200 in the longitudinal direction. The raised deck 300 is configured to be spaced from the base 100 by a distance that allows the underside 358 of the raised deck 300 to house one or more splitters 390 between the top of the raised deck 300 and the base 100. For example, in some aspects, the splitter 390 may be a 1×8 splitter that is configured to split one fiber optic cable from the distribution cable into eight pigtails that are each connected to an adapter 360 that is, in turn, configured to receive an LC connector 372 of one of the drop cables 152. In other aspects, one or two 1×4 splitters may each be configured to split one fiber optic cable from the distribution cable into four pigtails that are each connected to the adapter 360 that is, in turn, configured to receive the LC connector 372 of one of the drop cables 152.

The raised deck 300 may include a bulkhead 320, which may be a portion that is integrally molded with the raised deck 300. In some aspects, the bulkhead 320 may be a separate structure that is coupled with the raised deck 300 by any conventional mechanism. The raised deck 300 may includes holders 330 arranged to hold fusion splice protectors 332. For example, in some aspects, the holders 300 may include pegs 342 extending from a top surface 344 of the raised deck 300. Each of the holders 300 may include two pair of pegs 342 that are structure and arranged to receive and hold a plurality of fusion splice protectors 332 there between. As illustrated, the raised deck 300 may includes two pair of pegs 342 on each side of the bulkhead 320 to double the storage capacity of fusion splice protectors 332. The top surface 344 of the raised deck 300 may also include a plurality of clips 340 configured to store slack fiber optic cable from the distribution cable 120 that is being connected to the splitter 390, as discussed in more detail below.

As shown in FIG. 3, the bulkhead 320 includes an opening 348 configured to receive an adapter, for example, a dual LC adapter 350, as shown in FIG. 2. The adapter 350 may be secured to the bulkhead 320 may any conventional coupling mechanism. The bulkhead 320 includes side walls 358 extending from a lower surface 366 of the panel 200 to the top surface 344. The side walls 358 extend in a direction transverse to the longitudinal direction, and each of the side walls 358 includes an opening 368 configured to receive an adapter, for example, a dual LC adapter 360, as shown in FIGS. 1 and 2. In an embodiment that includes dual LC adapters 360, each adapter 360 is configured to receive a dual LC connector or two single LC connectors 372.

In an embodiment having a 1×8 splitter 390, each of the four LC adapters 360 is coupled with the splitter 190 to complete the connection between the spliced fiber of the distribution cable 120 and the fiber optic cables 156 of eight drop cables 152. In an embodiment having two 1×4 splitters, each of the four LC adapters 360 is coupled with a respective splitter 190 to complete the connection between two spliced fibers of the distribution cable 120 and the fiber optic cables 156 of eight drop cables 152.

Referring to FIGS. 1-3, the panel 200 includes first and second slack fiber storage regions 210, 220 for storing slack fiber 156 from one or more of the drop cables 152 to be connected with the LC connector modules 360. The first and second slack fiber storage regions 210, 220 are disposed at either side of the raised deck 300 in the longitudinal direction. The first slack fiber storage region 210 has a plurality of first wrap guides 212 that project upward from the lower surface 366 of the insert panel 200. Similarly, the second slack fiber storage region 220 has a plurality of second wrap guides 222 that project upward from the lower surface 366 of the insert panel 200. In some aspects, the first and second wrap guides 212, 222 form the first and second storage regions 210, 220 with arms that extend upward from the lower surface 366 of the insert panel 200 and terminate in fingers that extend substantially perpendicular to the arms and parallel to the lower surface 366 of the insert panel 200.

The first and second wrap guides 212, 222 are arranged to direct the slack fiber optic cable 156 to follow an arcuate path that is greater than or equal to a minimum bend radius of the fiber optic cable 156. The bend radius of the arcuate paths in the storage regions 210, 220 of the respective wrap guides 212, 222 are generally greater than the minimum permissible bend radius of the fiber optic cable 156 in order to prevent signal losses. For example, as the bend radius of an optical fiber or filament decreases below the minimum permissible bend radius, the incident light energy is not fully reflected internally of the optic filament and, thus, light energy is refracted out of the filament causing a portion of the light energy to be absorbed or lost.

FIG. 4 shows a close up of the portion of the base 100 that includes the grommet recess 105, and the grooves 170 and fiber holders 180 for holding the inner cable 156 of the drop cable 152. In this embodiment, the grooves 170 and fiber holders 180 are raised off the bottom of the base 100 to allow level passage to either of the first and second slack coil storage regions 210, 220.

Figure 7:
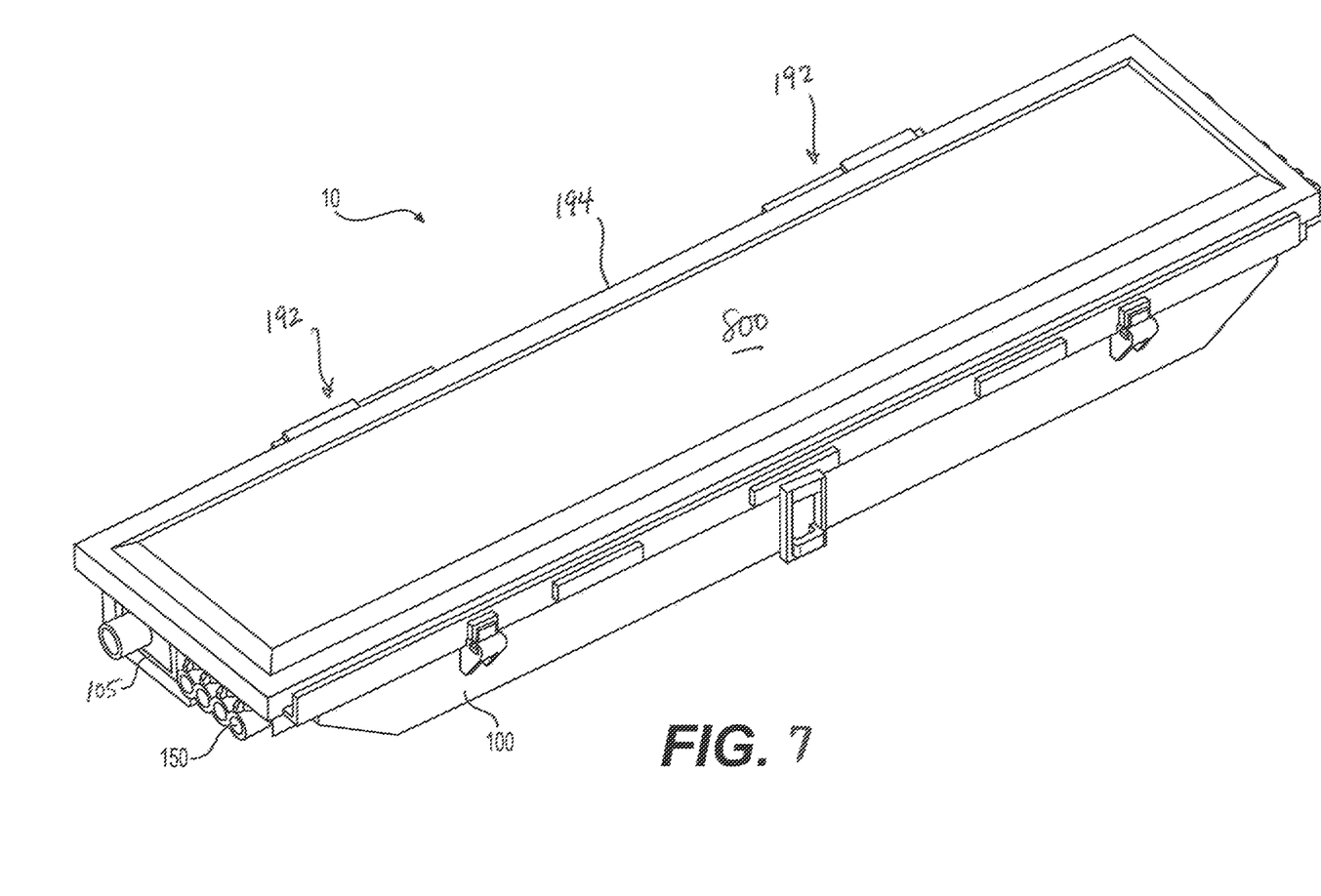
FIG. 7 is a perspective view of the fiber splice closure of FIG. 1 with a cover.

Referring to FIG. 7, the closure 10 includes a lid 800 that is configured to cooperate with the base 100 to close and seal the closure 10 in a weather tight manner, as would be understood by persons skilled in the art. In some aspects, the lid 800 may be pivotally coupled with the base 100 via a hinge 192 along a first side wall 194 of the base 100 that extends in the longitudinal direction. In some aspects, the lid 800 may be removably coupled with the base 100. It should be appreciated that any conventional mechanism for coupling the lid 800 with the base 100 is contemplated by this disclosure.

Also, it should be appreciated that one or more of the fiber optic cables of the distribution cable 120 may be connected to one or more of the drop cables 152 in any known manner. For example, in some aspects, a fiber optic cable of the distribution cable 120 may be connected to a drop cable 152 by direct splicing. In some aspects, a fiber optic cable of the distribution cable 120 may be spliced to a pigtail, which in turn is connected to a coupler configured to connect the pigtail directly to a drop cable 152.

Although FIG. 2 shows the LC adaptor 350 having two LC connection ports, in the case of a 1×8 splitter, only one of the two LC connection ports is connected to the splitter. In some embodiments, the closure 10 may include two 1×4 splitters that are coupled to the LC adaptor 350 such that each of the two LC connection ports is connected to the one of the splitters, and each of the LC connection ports can receive an LC connector from a different fiber optic cable of the distribution cable 120.

In use, the upper and lower portions 113, 114 of the grommets 110 are separated from one another and placed around the distribution cable 120 such the distribution cable 120 is disposed in the opening 112. The grommets 110 are placed into the recesses 105 at the first and second ends 102, 104 of the base 100. At least one cable clamp 130 is secured to the base 100 to secure the distribution cable 120 to the base 100. Further, one of the fiber optic cables from the distribution cable is removed from the distribution cable 120, as would be understood by persons skilled in the art. For example, a window is cut from the distribution cable by rotary cutting each end of the window and slitting the cable between each rotary cut. The outer jacket of the distribution cable is peeled off and a fiber is selected and cut. The cut fiber is then spliced to a first end of a pigtail cable having an LC connector at a second opposite end for connection with one of the LC connection ports on the LC adaptor 350. The splice between the fiber removed from the distribution cable 120 and the pigtail may be protected with splice protectors 332. The spliced protectors 332 may be a shrink wrap that surrounds the fiber splice to maintain the integrity of the splice and prevent damage to the splice.

Additional embodiments include any one of the embodiments described above, where one or more of its components, functionalities or structures is interchanged with, replaced by or augmented by one or more of the components, functionalities or structures of a different embodiment described above. For example, although the disclosed embodiment is described with LC connectors and adapters, other fiber optic adapters, including but not limited to SC connector and adapters, are contemplated by the disclosure.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. An inline fiber splice closure for housing an optical connection between a distribution cable and at least one drop cable of an optical network, the fiber splice closure comprising:
    a base including a first end wall extending from a first side wall to a second side wall and an opposite second end wall extending from the first side wall to the second side wall,
        wherein the first end wall includes:
            a recess configured to receive a distribution cable, and
            at least one first drop cable through bore port extending through the first end wall adjacent to the recess in the first end wall; and
        wherein the second end wall includes:
            a recess configured to receive the distribution cable, and
            at least one second drop cable through bore port extending through the second end wall adjacent to the recess in the second end wall;
    a first grommet configured to be received by the recess in the first end wall, and a second grommet configured to be received by the recess in the second end wall;
    at least one cable clamp having a U-shaped opening configured to receive the distribution cable;
    a panel configured to be removably received in an interior of the base such that the panel is removable relative to the first end wall, the second end wall, the at least one first drop cable through bore port, and the at least one second drop cable through bore port,
        wherein the panel includes:
            a raised deck having an underside spaced from the base, and
            a first wrap guide and a second wrap guide on a side of the panel opposite to the underside and on opposite sides of the raised deck, each of the first and second wrap guides being configured to house slack of a drop cable;
    a splitter in a space between the underside of the raised deck and the base;
    wherein the raised deck includes at least one adapter configured to receive a connector of a cable from the splitter and a connector of a drop cable;
    wherein the at least one first drop cable port is configured to receive a first drop cable having a terminated end pushed through the at least one first drop cable port;
    wherein the at least one second drop cable port is configured to receive a second drop cable having a terminated end pushed through the at least one second drop cable port; and
    wherein at least one of the first grommet and the second grommet includes an opening configured to receive the distribution cable and to seal the opening and to seal a recess in the respective first end wall or second wall in order to prevent passage of moisture into the closure.

2. The inline fiber splice closure of claim 1, wherein screw holes are arranged in a radial side wall of the first and second drop cable ports and are configured to receive a fixing device to secure the at least one drop cable.

3. The inline fiber splice closure of claim 1, wherein the panel further includes a plurality of splice protector holder elements extending from a top of the center section and configured to hold at least one splice protector.

4. The inline fiber splice closure of claim 1, wherein the raised deck includes an LC adaptor configured to receive the second optical fiber from the distribution cable and connect the second optical fiber with the splitter module.

5. The inline fiber splice closure of claim 1, wherein the raised deck includes an LC connector module mounted to a side face of the center section and configured to connect the first optical fiber with the splitter module to provide an optical connection between the distribution cable and the drop cable.

6. The inline fiber splice closure of claim 1, wherein the at least one of the first tubular portion and the second tubular portion of the first cable drop port includes a first boss extending radially from the first cable drop port,
    wherein the boss is sized to receive a fixing member, and the fixing member and the boss are sized relative to one another such that the fixing member is configured to penetrate an outer jacket of the drop cable without reaching a fiber optic cable within the outer jacket.

7. The inline fiber splice closure of claim 1, wherein the cable clamp is between the first grommet and the second grommet in the longitudinal direction.

8. An inline fiber splice closure for housing an optical connection between a distribution cable and at least one drop cable of an optical network, the fiber splice closure comprising:
    a base including a first end wall extending from a first side wall to a second side wall and an opposite second end wall extending from the first side wall to the second side wall,
        wherein the first end wall includes:
            a recess configured to receive a distribution cable, and
            at least one drop cable port extending through the first end wall adjacent to the recess in the first end wall; and
        wherein the second end wall includes a
        recess configured to receive the distribution cable;

a first grommet configured to be received by the recess in the first end wall, and a second grommet configured to be received in the recess in the second end wall;
at least one cable clamp having a U-shaped opening configured to receive the distribution cable;
a panel configured to be removably received in an interior of the base such that the panel is removable relative to the first end wall, the second end wall, and the at least one drop cable port,
wherein the panel includes:
a raised deck having an underside spaced from the base, and
at least one wrap guide on a side of the panel opposite to the underside, the at least one wrap guide being configured to house slack of a drop cable:
a splitter in a space between the underside of the raised deck and the base;
wherein the raised deck includes at least one adapter configured to receive a connector of a cable from the splitter and a connector of the drop cable;
wherein the at least one drop cable port is configured to receive the drop cable having a terminated end pushed through the at least one drop cable port; and
wherein at least one of the first grommet and the second grommet includes an opening configured to receive the distribution cable and to seal the opening and to seal a recess in the respective first end wall or second wall in order to prevent passage of moisture into the closure.

9. The inline fiber splice closure of claim 8, wherein a screw hole is arranged in a radial side wall of each of the at least one drop cable ports and is configured to receive a fixing device to secure the at least one drop cable.

10. The inline fiber splice closure of claim 8, wherein the panel further includes a plurality of splice protector holder elements extending from a top of the center section and configured to hold at least one splice protector.

11. The inline fiber splice closure of claim 8, wherein the raised deck includes an LC adaptor configured to receive the second optical fiber from the distribution cable and connect the second optical fiber with the splitter module.

12. The inline fiber splice closure of claim 8, wherein the raised deck includes an LC connector module mounted to a side face of the center section and configured to connect the first optical fiber with the splitter module to provide an optical connection between the distribution cable and the drop cable.

13. The inline fiber splice closure of claim 8, wherein the at least one of the first tubular portion and the second tubular portion of the at least one cable drop port includes a first boss extending radially from the at least one cable drop port,
wherein the boss is sized to receive a fixing member, and the fixing member and the boss are sized relative to one another such that the fixing member is configured to penetrate an outer jacket of the drop cable without reaching a fiber optic cable within the outer jacket.

14. The inline fiber splice closure of claim 8, wherein the cable clamp is between the first grommet and the second grommet in the longitudinal direction.

15. An inline fiber splice closure for housing an optical connection between a distribution cable and at least one drop cable of an optical network, the fiber splice closure comprising:
a base including a first end wall extending from a first side wall to a second side wall and an opposite second end wall extending from the first side wall to the second side wall,
wherein the first end wall includes:
a recess configured to receive a distribution cable, and
a drop cable port extending through the first end wall adjacent to the recess;
a grommet configured to be received by the recess in the first end wall;
a cable clamp having a U-shaped opening configured to receive the distribution cable;
a panel configured to be removably received in an interior of the base such that the panel is removable relative to the first end wall, the second end wall, and the at least one drop cable port,
wherein the panel includes:
a raised deck having an underside spaced from the base, and
at least one wrap guide on a side of the panel opposite to the underside, the at least one wrap guide being configured to house slack of a drop cable; and
a splitter in a space between the underside of the raised deck and the base.

16. The inline fiber splice closure of claim 15, wherein the grommet includes an opening configured to receive the distribution cable and to seal the opening and to seal a recess in the respective first end wall or second wall in order to prevent passage of moisture into the closure.

17. The inline fiber splice closure of claim 15, wherein a screw hole is arranged in a radial side wall of the drop cable port and is configured to receive a fixing device to secure the drop cable.

18. The inline fiber splice closure of claim 15, further comprising:
a panel configured to be received in an interior of the base, the panel including
at least one wrap guide configured to house slack of the drop cable, and
a raised deck,
wherein the raised deck is configured to include
a splitter configured to receive a connector of a pigtail cable,
at least one adapter configured to receive a connector of a cable from the splitter and a connector of a drop cable.

19. The inline fiber splice closure of claim 18, wherein the panel further includes a plurality of splice protector holder elements extending from a top of the center section and configured to hold at least one splice protector.

20. The inline fiber splice closure of claim 18, wherein the raised deck includes an LC adaptor configured to receive the second optical fiber from the distribution cable and connect the second optical fiber with the splitter module.

21. The inline fiber splice closure of claim 18, wherein the raised deck includes an LC connector module mounted to a side face of the center section and configured to connect the first optical fiber with the splitter module to provide an optical connection between the distribution cable and the drop cable.

22. The inline fiber splice closure of claim 15, wherein at least one of the first tubular portion and the second tubular portion includes a boss extending radially from the cable drop port,
wherein the boss is sized to receive a fixing member, and the fixing member and the boss are sized relative to one another such that the fixing member is configured to penetrate an outer jacket of the drop cable without reaching a fiber optic cable within the outer jacket.

\* \* \* \* \*